UNITED STATES PATENT OFFICE.

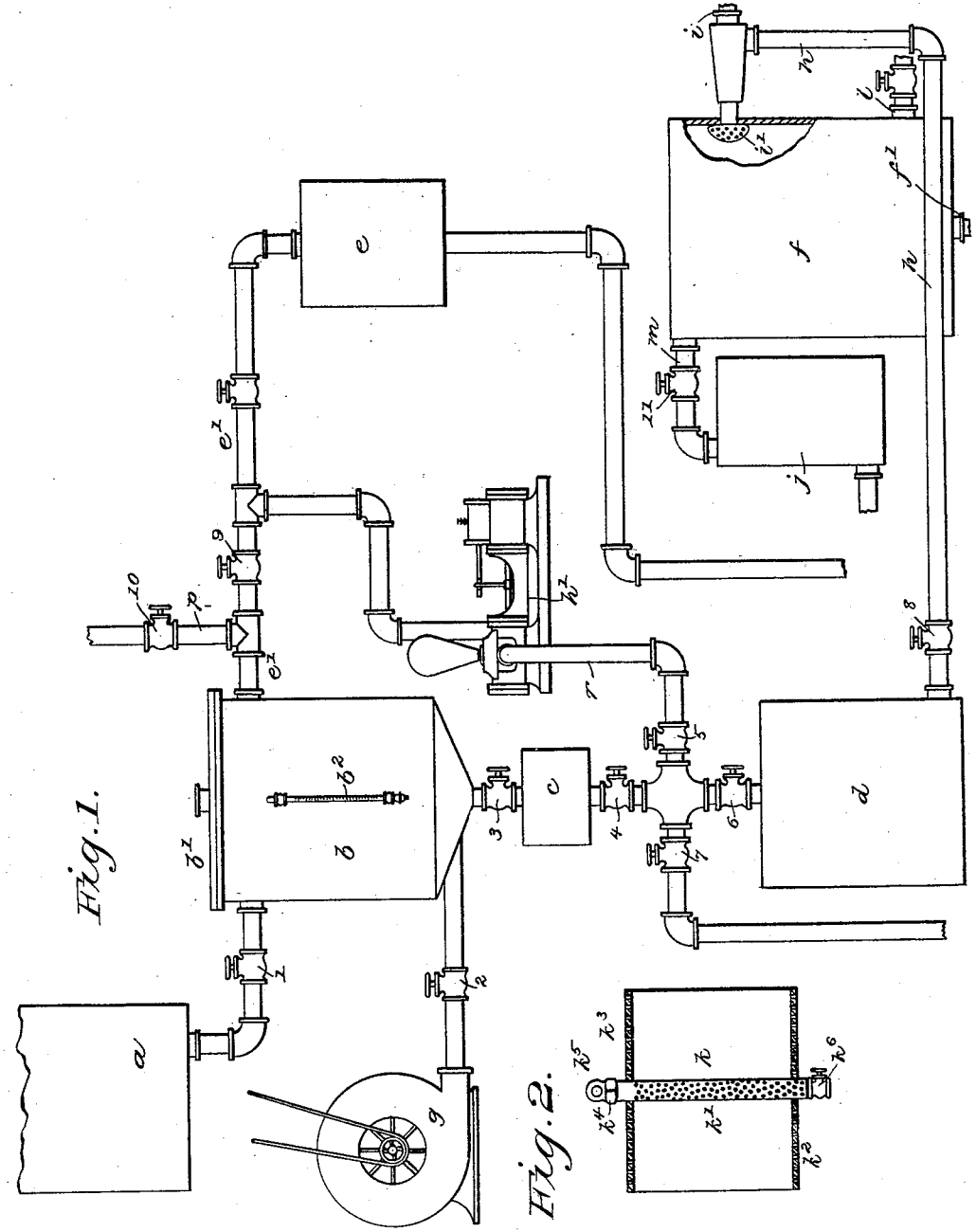

WILLIAM T. CUTTER, OF EAST LYME, CONNECTICUT, ASSIGNOR OF TWO-THIRDS TO CHAS. J. LUCE, OF SAME PLACE.

PROCESS OF EXTRACTING FAT FROM WOOL.

SPECIFICATION forming part of Letters Patent No. 482,995, dated September 20, 1892.

Application filed March 6, 1891. Serial No. 383,976. (No specimens.)

*To all whom it may concern:*

Be it known that I, WILLIAM T. CUTTER, of East Lyme, in the county of New London and State of Connecticut, have invented certain new and useful Improvements in the Process of Treating Raw Wool, of which the following is a full, clear, and exact description, whereby any one skilled in the art can make and use the same.

The object of my invention is to provide a process for extracting fat from wool and rendering the wool fit for manufacturing purposes by the use of solvents without elaborate and expensive machinery, and by which is produced a comparatively pure and clear solution of naphtha or other suitable fat solvent, and fat separated from other foreign matters commonly found in raw wool.

I am aware that it is not new to make use of solvents for the purpose of removing fat from wool.

My invention directly relates to the process of removing the wool-fat by the use of a suitable solvent, as naphtha, from wool to prepare the latter for manufacture; and it involves a subsequent treatment of the materials whereby the valuable potash salts are recovered and the wool fiber is left unbroken, unfelted, and in a pure condition ready for manufacture, and by this process a larger percentage of pure wool is produced than by a process in which hot, caustic alkalies are used. I have discovered that by allowing naphtha slowly to trickle through the wool and to be repeatedly returned the suspended impurities are retained in the mass of wool, the wool serving somewhat as a mechanical filter, and the solvent finally appears as a clear solution, which can be then distilled to separate the fat and recover the solvent. The remaining valuable portions of the foreign matter, including potash salts, may be recovered in any usual manner, and the wool finally cleansed by water-washing and rendered fit for manufacturing purposes. The machinery required for this process is comparatively simple and inexpensive.

My invention consists in the method of cleaning the wool, and also clarifying the solvent, as more particularly hereinafter described, and pointed out in the claims.

Referring to the drawings, Figure 1 is a diagram view of an apparatus in which my improved process of cleaning wool may be carried out. Fig. 2 is a sectional elevation of the separator-basket.

In the accompanying drawings, the letter $a$ denotes a naphtha-tank forming part of an apparatus by the use of which my invention may be practiced. A delivery-pipe from this tank leads to a separator $b$, which latter consists of a vessel adapted for holding wool and preferably of a capacity of about thirty-two (32) cubic feet, and in operation about two-thirds filled with raw unwashed wool of an average weight of about two hundred and fifty (250) pounds. This separator $b$ is provided with a cover $b'$, so fitted that it may be tightly closed to hermetically seal the vessel.

Within the separator $b$ a basket $k$ is arranged, and it consists, preferably, of a centrally-perforated tube $k'$, a disk-shaped bottom $k^2$, and a disk-shaped top $k^3$, which disks are adapted to fit snugly within the separator and are perforated for the passage of fluids. The central tube is provided at the upper end with a nut $k^4$, to which is secured an eye $k^5$, that affords means for attaching a hook by means of which the basket can be handled. The hollow central tube of the basket is provided with a check-valve $k^6$, arranged to open inwardly, so as to allow the inflow of air from the bottom of the separator, the said check-valve also serving to obstruct the outflow of naphtha or other suitable fat solvents from within. The separator is provided with a sight-glass $b^2$, conveniently located at one side for the purpose of observing the height of liquid in the separator. At the bottom of the separator there is a tubular outlet communicating with a vessel $c$, that is, in part at least, of glass, so as to allow the solution to be examined as it passes out from the separator into the circulation-tubes, by means of which it is returned to the tank for repassage through the separator until it has reached a certain density or condition that may be ascertained by inspection through the glass. The vessel $c$ discharges, preferably through a pipe at its bottom, into holders $d$ as soon as the solution has reached the proper condition of purity.

The delivery-pipe of a fan-blower $g$ is connected to the bottom of the separator below the bottom of the basket, and by means thereof a current of air heated to about two hundred and thirty degrees (230°) Fahrenheit may be passed through the separator $b$ and its contents, whereby the latter is thoroughly dried prior to the introduction of the naphtha, and the fat which envelops the wool fiber is so loosened that the solution will more readily remove it, thus minimizing the quantity of naphtha required.

From the naphtha-tank or other suitable source of supply a sufficient quantity of naphtha to saturate and cover the wool is supplied to the separator $b$. The naphtha is a solvent for the fat or animal oil in the wool, and it is, after a certain time, drawn from the bottom of the separator in a slow stream through the outlet-pipe into the vessel $c$, a valve 3 for controlling the flow being provided in the intermediate pipe. This naphtha holding the fat in solution is pumped repeatedly back by means of any suitable form of pump $h'$ through the branch pipe $r$, in which a valve 5 is located, that connects with the outlet from the vessel $c$. The pump $h'$ delivers the solution into the tank, from which it flows again through the separator, and this is continued until the solution runs clear and free from any extraneous matter, the wool, in fact, forming a sort of mechanical filter for the naphtha. The solution is then in proper condition to submit to distillation for the purpose of separating the naphtha from the fat by a process that is hereinafter described, and when it has reached this condition it is allowed to flow into the holder $d$ by opening the valves 4 and 6 and closing valves 7 and 5 in the several pipes that are joined to the connection between the vessel $c$ and holder $d$. The wool while in the separator is again saturated with naphtha until it shows but little traces of fat or is exhausted, and this last run of naphtha may be used to saturate a fresh batch of wool in a repetition of the process. After a batch of wool has been cleansed of its fat in the manner described the valve 2 in the delivery-pipe of the exhaust-blower is opened and a current of air at a temperature of about two hundred and fifty degrees (250°) Fahrenheit is caused to pass through the wool that holds a certain portion of the naphtha adhering to it, and by this current it is vaporized and driven through the connecting-pipe $e'$, through a condenser $e$, and delivered into a tank. The valve 9 in the pipe $e'$ controls the flow of any fluid through the pipe. On the separator side of the valve 9 there is an exhaust-pipe $p$, through which any vapor may be discharged by closing the valve 9 and opening valve 10. After this hot-air treatment the wool is thoroughly dried at a temperature of about two hundred and fifty degrees (250°) Fahrenheit, and then water at a temperature of about one hundred degrees (100°) Fahrenheit is admitted into the separator in any suitable manner. By the flow of this water the potash salts are washed out, and from the resultant mixture the pure salts may be recovered in the usual manner. After this treatment the cover of the separator is removed and the basket, with its contents, lifted out and the wool rinsed in tepid water.

As a portion of the naphtha-purifying mechanism the still $f$ is used, and it consists of a steam-jacketed apparatus connected by means of pipe $h$ with the bottom of the holder. A steam-pipe $i$, leading from a suitable source of steam-supply, is arranged to deliver into the still, and the pipe $h$ is united to the pipe $i$ in such manner that the flow of steam through the pipe $i$ draws the naphtha with it by an operation analogous to that of an injector and delivers it in a spray through the rose-jet $i'$ into the still. Another steam-pipe $l$ projects within the still and it is perforated so as to deliver jets of steam within the still, and mixed steam and naphtha pass out through the pipe $m$, in which the valve 11 is fixed, through the worm to a condenser $j$, and is then delivered into a tank, from which the naphtha may be pumped into the tank from which the separator is supplied. The lower part of the still $f$ is provided with a delivery-pipe $f'$, having a valve to control the flow and through which the fat that has been separated from the naphtha may be drawn off into any suitable vessel.

A preferred manner of practicing my invention is as follows: The naphtha-tank $a$ is first filled with naphtha and a supply of wool put into the separator, the perforated top of the basket being put in place and the nut screwed on to afford a means of handling the basket and its contents. The cover of the separator is then clamped on and sealed and hot air from the blower is admitted through the mass of wool until all moisture has been driven out through the pipe $p$. In this operation valves 1, 3, and 9 are closed and valves 2 and 10 opened. The blower is then shut off by closing valve 2. Valve 10 is still left open and valves 3, 4, 5, and 9 then opened and naphtha admitted through valve 1 until the glass gage $b^2$ shows the solution to stand at about level with the top of the basket. By connecting the pump $h'$ with the vessel $c$ and the separator the naphtha is caused to circulate rapidly through the separator, and this circulation is continued until the solution shows clear at $c$, when valve 5 is closed and valves 6 and 8 are opened. Valve 11 in the connection between the still and condenser is opened, and this lets air escape through the condenser. After the wool in the separator $b$ is free from fat the valves 3 and 10 are closed (valves 1 having been previously closed) and valve 2 is opened. A current of hot air driven from the blower removes the naphtha, which latter passes out through valve 9 into the condenser $e$ and thence into a storage-tank. The valves 2, 6, and 9 are then closed, valves 3, 4, and 7 are opened, and water admitted by opening valve 10, and this flows out at valve 7, removing the potash in solution and carrying it into an evaporator, by means of which the potash salts are recovered. The cover of the separator is then removed and a block attached and falls or tackle or other means used to lift the basket and wool freed of fat and potash out of the separator and moved to where it may be rinsed in tepid water and dried. Steam is then allowed to enter the still $f$ through the pipe $i$, valve 8 in the connecting-pipe to the naphtha-holder being opened and the solution or mixture of naphtha and fat drawn into the still and separated in the manner already described, the valve in the steam-pipe $l$ being opened, so that a supply of steam enters to keep the fat in a liquid condition, so that it may be drawn off through the delivery-pipe $f'$. The naphtha that passes over in the form of a vapor through the pipe $m$ is condensed and delivered into a storage-tank, whence it may be pumped into the supply-tank $a$.

I have found by repeated experiments that the complete and perfect elimination of the foreign matters other than the wool-fat takes place in the separator before the fat in the wool is exhausted. The foreign matters other than the wool-fat are thus rendered absolutely free in the separator (and not by any subsequent process) and are removable by ordinary water-washing. The solution of naphtha and fat in the practice of my process is practically free from all extraneous matter, except free fatty acids and wool-fat, and ready for immediate distilling. This is also one of the important features of my invention. I eliminate that part of the natural wool that is harmful and worthless so far as known and produce a high-gravity solution of naphtha and fat at one process, treating the raw unwashed wool directly just as it comes from the fleece.

I have referred to the fat solvent preferably used by me in the practice of my invention as "naphtha;" but by that term I mean to include all suitable solvents of fat that are the equivalent of naphtha in their action upon the fat and fatty acids in the material to be cleansed and purified.

My process obviously differs greatly from those that depend upon the removal of the fats by saponification, and also from those in which a continuous flow of a solvent is employed, the solvent passing from vessel to vessel.

It is obvious that my invention is not confined to any specific form of machinery, and that described herein is simply one form in which the invention may be successfully practiced. Neither do I restrict my invention to any particular method of or means for removing the naphtha from the wool, nor of removing the suint, the broad invention consisting in the removal of the oil from the wool in the first instance by repeated flowing or percolating of naphtha through the wool.

I claim as my invention—

1. The process of cleansing animal fiber, as wool, that consists in passing and repassing the initial quantity of naphtha at a regulated speed through the animal fiber that is inclosed in a vessel, then passing a current of hot air in a reverse direction through the mass of fiber, and then washing the mass by passing a current of water through it, all substantially as described.

2. The process of cleaning wool, that consists in confining a compressed mass of the material in a closed vessel, then passing a current of hot air at a temperature of about 250° Fahrenheit through the mass, and then saturating the mass with a suitable fat solvent and passing and repassing the initial quantity of the solvent at a regulated speed through the mass of wool, all substantially as described.

3. The process of cleaning wool, that consists in first drying the mass of wool, that is held in a suitable vessel, by passing a current of hot air therethrough and then subjecting the dried mass to repeated washings by a suitable fat solvent repeatedly passed through the mass, then driving off the excess of solvent by a current of hot air, and then washing out the potash salts and other deposited impurities from the mass of wool by means of a current of water at a suitable temperature passed through the mass, all substantially as described.

4. The process of cleaning wool fiber, that consists in first drying the mass of wool, that is held in a suitable vessel, by passing a current of hot air therethrough and then subjecting the dried mass to repeated washings by a suitable fat solvent repeatedly passed through the mass, then driving off the excess of solvent by a current of hot air, and then washing out the potash salts and other deposited impurities from the mass of the wool by means of a current of water at a temperature of about 100° Fahrenheit passed through the mass, all substantially as described.

5. The process of extracting the fat from wool, which consists in subjecting the greasy wool to the action of a suitable solvent of fat in an inclosing receptacle and repeatedly percolating the same or initial charge of solvent through the wool, substantially as described.

6. The process of extracting fat from a fibrous material, which consists in subjecting a mass of such greasy fibrous material to the action of naphtha in an inclosing receptacle and repeatedly percolating the initial charge of solvent through the mass, substantially as described.

7. The process of extracting the fat from wool, which consists in percolating the fat solvent through greasy wool and thereby freeing it of foreign matter, then repeatedly passing this resulting solution so charged through the wool until the fatty bodies are dissolved out and taken up by the solvent and the suspended impurities are filtered out and deposited in the wool, all substantially as described.

8. The process of cleansing wool from grease and other foreign matters, which consists in subjecting wool in an inclosing receptacle to the action of a current of suitable solvent, then filtering the initial charge of solvent through the wool to dissolve out the fatty bodies and redeposit the suspended impurities in the wool and repeating the percolation of this initial charge of solvent until the fluid solution of fatty matters is substantially clear of suspended impurities, and then washing the wool to cleanse it of the deposited impurities, all substantially as described.

9. The process of clarifying a fatty solution obtained by passing a quantity of suitable fat solvent, as naphtha, through a mass of animal fiber, that consists in repeatedly filtering this solution of fat mixed with foreign matter through a mass of the same animal fiber, all substantially as described.

WILLIAM T. CUTTER.

Witnesses:
HENRY P. BULLARD,
ABBIE A. CAULKINS.